United States Patent
Tanchon

(10) Patent No.: US 12,198,837 B2
(45) Date of Patent: Jan. 14, 2025

(54) ELECTRICALLY AND THERMALLY CONDUCTIVE ELEMENT AND METHOD FOR PRODUCING SUCH AN ELEMENT

(71) Applicant: ABSOLUT SYSTEM, Seyssinet-Pariset (FR)

(72) Inventor: Julien Tanchon, Seyssins (FR)

(73) Assignee: ABSOLUT SYSTEM

( * ) Notice: Subject to any disclaimer, the term of this patent is extended or adjusted under 35 U.S.C. 154(b) by 239 days.

(21) Appl. No.: 17/793,970

(22) PCT Filed: Feb. 9, 2021

(86) PCT No.: PCT/FR2021/050230
§ 371 (c)(1),
(2) Date: Jul. 20, 2022

(87) PCT Pub. No.: WO2021/160960
PCT Pub. Date: Aug. 19, 2021

(65) Prior Publication Data
US 2023/0098820 A1    Mar. 30, 2023

(30) Foreign Application Priority Data
Feb. 10, 2020   (FR) .................................... 2001311

(51) Int. Cl.
*H01B 7/42* (2006.01)
*H01B 1/02* (2006.01)
*H01B 3/30* (2006.01)
*H01B 7/08* (2006.01)
*H02K 55/00* (2006.01)

(52) U.S. Cl.
CPC ............ *H01B 7/421* (2013.01); *H01B 1/02* (2013.01); *H01B 3/306* (2013.01); *H01B 7/0823* (2013.01); *H02K 55/00* (2013.01)

(58) Field of Classification Search
CPC .......... H01B 7/421; H01B 1/02; H01B 3/306; H01B 7/0823; H02K 55/00; H02K 3/02; Y02E 40/60
See application file for complete search history.

(56) References Cited

U.S. PATENT DOCUMENTS

2019/0027988 A1    1/2019   Filipenko et al.

FOREIGN PATENT DOCUMENTS

| CN | 204946585 U | 1/2016 | |
| CN | 110429754 A | 11/2019 | |
| WO | WO-2014087318 A1 * | 6/2014 | ............ F21V 29/70 |
| WO | 2020002817 A1 | 1/2020 | |

OTHER PUBLICATIONS

International Search Report in related PCT Application No. PCT/FR2021/050230, mailed May 4, 2021.
French Search report in related French Application No. FR 2001311 mailed Oct. 21, 2020.

* cited by examiner

*Primary Examiner* — Mohamad A Musleh
(74) *Attorney, Agent, or Firm* — Thomas | Horstemeyer, LLP

(57) ABSTRACT

The invention relates to an electrically and thermally conductive element (100) comprising: —a wire or ribbon (1) of high-purity aluminium; —a strip (2) of pyrolytic graphite or of graphene extending along the aluminium ribbon (1), said wire or ribbon (1) and the strip (2) being encapsulated together in a sheath (3) of an electrically insulating material.

9 Claims, 5 Drawing Sheets

ELECTRICALLY AND THERMALLY CONDUCTIVE ELEMENT AND METHOD FOR PRODUCING SUCH AN ELEMENT

CROSS REFERENCE TO RELATED APPLICATIONS

This application is the 35 U.S.C. § 371 national stage application of PCT Application No. PCT/FR2021/050230, filed Feb. 9, 2021, which application claims the benefit of French Application No. FR 2001311 filed Feb. 10, 2020, both of which are hereby incorporated by reference herein in their entireties.

FIELD OF THE INVENTION

The invention relates to an electrically and thermally conductive element and a method for manufacturing such an element.

STATE OF THE ART

There are various types of electric motors (brush or brushless DC motors, AC motors, synchronous or asynchronous motors, linear motors, stepper motors, etc.).

In all cases, the armature of the motor comprises one or more coils consisting of a winding of an electrically conductive element.

The number of coils depends on the motor configuration and the number of poles required.

In most applications, the electrically and thermally conductive element consists of a copper wire. Indeed copper is a good electrical conductor and also a good thermal conductor. It can therefore carry a large amount of current with limited Joule effect dissipation. Its good thermal conductivity also enables the windings to be cooled efficiently and thus the current density to be increased in the wires.

For applications operating at high frequencies (AC supply), the variations in electrical current in the inductor generate eddy current losses in the conductive elements of the coil. These losses are on the surface and can be limited by the use of Litz wires. A Litz wire is a multi-strand conductive wire adapted to carry high frequency current. Each wire consists of strands that are electrically insulated from each other, thus reducing intensity of surface eddy currents.

However, copper is a high density material.

Space and aeronautical applications using electric motors are greatly developing. For these applications, the mass of the motors is a critical factor and the use of copper coils becomes problematic. Indeed, in order to increase the specific power of the motors (or generators), the current density in the coils has to be increased while lowering their mass. These two restrictions are totally antagonistic and copper does not allow a satisfactory compromise to be achieved because increasing the current density requires cooling of the windings and increasing the cross-sectional area of the wires, which are not compatible with a reduction in mass.

Some coils are therefore made with aluminium as an electrically and thermally conductive element instead of copper.

Aluminium has a lower density than copper, but also a higher electrical resistivity (thus higher Joule effect dissipation) and a lower thermal conductivity (implying poorer cooling of the windings).

An aluminium conductive element is therefore not a fully satisfactory solution to the problem.

SUMMARY OF THE INVENTION

It is therefore one purpose of the invention to design an electrically and thermally conductive element which optimises the current density flowing through the element and the heat dissipation of the element while minimising its mass.

An object of the invention relates to an electrically and thermally conductive element comprising:
 a high purity aluminium wire or tape,
 a pyrolytic graphite or graphene strip extending along the aluminium tape,
 said wire or tape and strip being encapsulated together in a sheath of an electrically insulating material.

By "high purity" it is meant in this text a purity of more than 99%.

This composite conductive element takes advantage of the low mass of aluminium while providing improved thermal performance due to the pyrolytic graphite.

In some embodiments, the electrically insulating material of the sheath is a polyimide, such as Kapton™.

In some embodiments, the wire or tape is electrically insulated from the strip by a layer of said electrically insulating material.

In some embodiments, the tape has a thickness of between 10 and 200 µm.

In some embodiments, the strip has a thickness of between 10 and 200 µm.

In some embodiments, the pyrolytic graphite strip extends laterally outwardly of the tape, allowing it to be easily coupled to a heat removal system.

Another object relates to a coil comprising at least one winding of an electrically and thermally conductive element as described above.

Another object relates to a rotating machine comprising at least one such coil. Said machine comprises:
 a stator comprising at least one coil as described above,
 a rotor comprising at least one superconductive element, the rotor being rotatably movable relative to the stator, and
 a cryostat surrounding the rotor for maintaining the superconductive element at a cryogenic temperature, said cryostat being fixed relative to the stator.

Finally, the invention also relates to a method for manufacturing an electrically and thermally conductive element as described above. Said method comprises:
 providing a high purity aluminium wire or tape,
 applying a pyrolytic graphite strip along the wire or tape,
 depositing an electrically insulating material so as to form a sheath encapsulating the aluminium wire or tape and the pyrolytic graphite strip.

BRIEF DESCRIPTION OF THE DRAWINGS

Further characteristics and advantages of the invention will become apparent from the following detailed description, with reference to the attached drawings in which.

Elements referred to by the same reference sign from one figure to another are identical or perform the same function.

For reasons of legibility of the figures, the various elements are not necessarily drawn to scale.

DETAILED DESCRIPTION OF EMBODIMENTS

The invention provides a composite element that is electrically and thermally conductive, that is combining two materials each contributing to a property of the element.

In the following, the term "conductive element" will be used for the sake of brevity, but it goes without saying that the element is both electrically and thermally conductive.

The composite conductive element comprises a high purity aluminium wire or tape, providing good electrical conduction. In some embodiments, a wire with a circular or square cross-section may be selected. However, preferably a tape is chosen, which has a rectangular cross-section with a width much greater than the thickness.

Indeed, high purity aluminium foils with a small thickness (typically 10 to 200 µm) are readily available on the market. The width of the tape can be adjusted when cutting the aluminium foil. This electrically conductive tape with a small thickness thus limits development of surface eddy currents which are particularly critical in electromechanical systems operating at high speeds (typically above 40 Hz). To further reduce development of eddy currents, it is possible to reduce the width of the tape during cutting so as to further reduce the surface area of said electrically conductive tape. Depending on the applications, the width of the tape may be between 2 and 50 mm.

The composite conductive element further comprises a pyrolytic graphite strip which extends along the aluminium wire or tape.

Pyrolytic graphite is a synthetic material formed from layers of graphene with covalent bonds. This material has a single cleavage plane, in which the thermal conductivity is very high. Thus, pyrolytic graphite has a thermal conductivity about three times that of copper and a density five times lower.

Encapsulated directly with the electrically conductive wire or tape, the pyrolytic graphite strip therefore enables homogeneous cooling over the entire surface of the winding with exceptional performance.

The use of high purity aluminium limits the increase in electrical resistivity of the aluminium winding in comparison with copper. Joule effect dissipation is greater than with copper, but the pyrolytic graphite strip directly encapsulated with the electrically conductive wire or tape allows this additional heat dissipation to be easily removed.

The pyrolytic graphite strip may be between 3 and 60 mm wide and between 10 and 200 µm thick.

Figure 4:
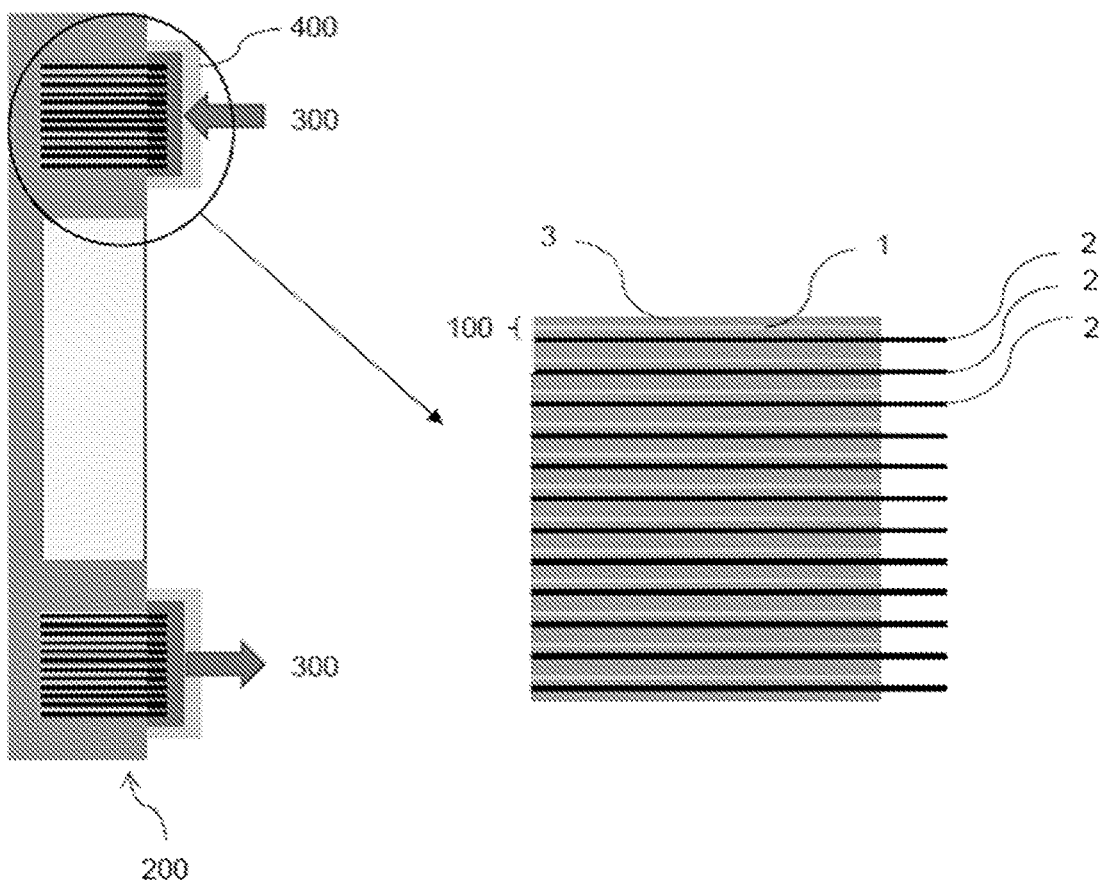
FIG. 4 is a schematic diagram of a coil including a conductive element according to the invention, comprising a direct connection to a heat removal system.
Figure 5:
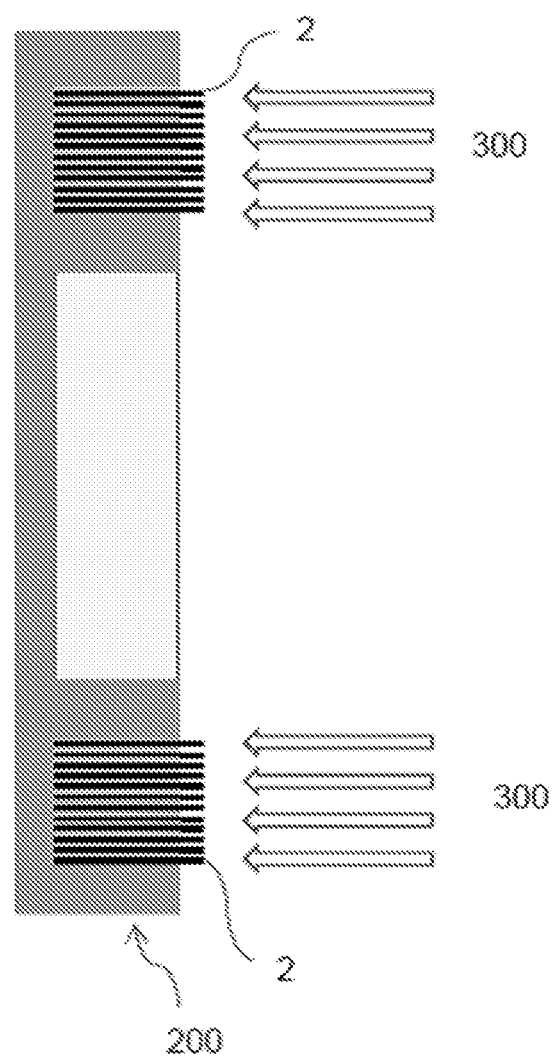
FIG. 5 is a schematic diagram of a coil including a conductive element according to the invention comprising a direct connection to a heat removal system.

In some embodiments, the pyrolytic graphite strip is wider than the aluminium wire or tape. Thus, a side portion of the graphite strip extends outwardly, allowing direct connection to a heat removal system. Examples are illustrated in FIGS. 4 and 5 which are described in detail below.

To provide electrical insulation between the aluminium wire or tape and the thermally conductive graphite strip, and to electrically insulate the conductive element an electrically insulating material is used. This electrically insulating material can be a polyimide, which provides optimal encapsulation of the individual components. Kapton™ is a polyimide that forms an excellent thermal insulator that also has very good temperature resistance (which is necessary for the insulation of the windings). It also has the advantage of being used in liquid form to ensure good encapsulation of all the components making up the composite, of being polymerised after assembly in order to obtain a flexible and perfectly electrically insulated composite, of being able to be deposited in thin layers (typically in the order of 1 to 100 µm) in order to limit the thickness of the composite conductive element. This increases the number of turns in the formation of a coil and thus the magnetic field while lowering the temperature gradients in the composite conductor.

Figure 1:
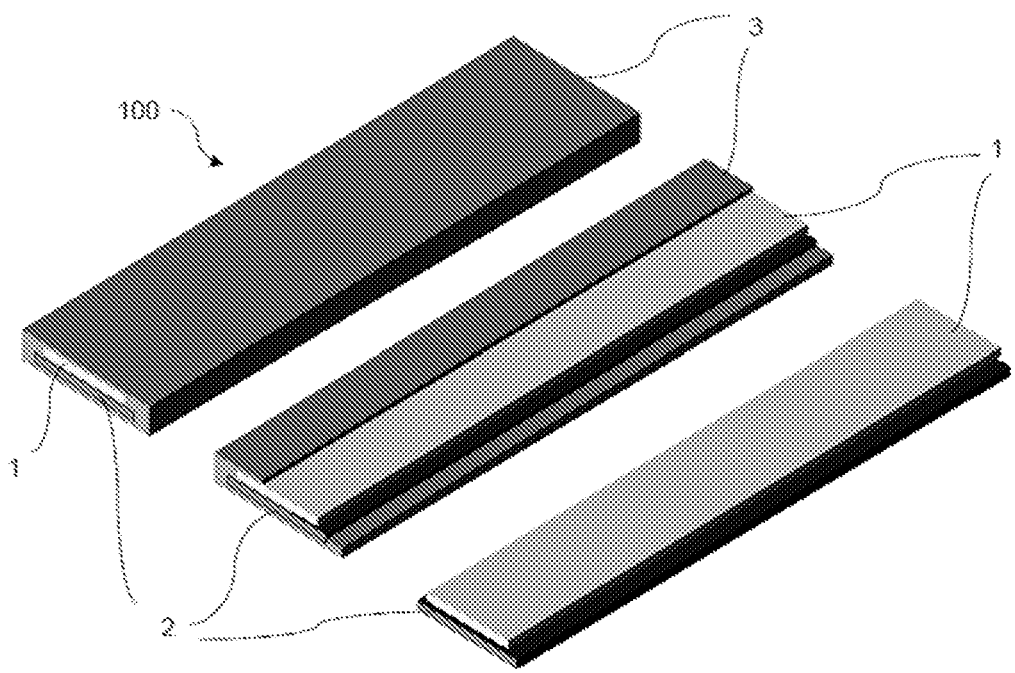
FIG. 1 is a perspective view of a conductive element according to one embodiment of the invention, at different stages of its manufacture.

FIG. 1 is a perspective view of a conductive element according to one embodiment of the invention, at different stages of its manufacture.

In the right-hand side of the figure, a portion of a high purity aluminium tape 1 and a portion of a pyrolytic graphite strip 2 are represented. As the conductive element is intended to form a coil, it has an elongated shape whose length is much greater than its width, said length typically being several tens of centimetres or metres.

Although not visible, a thin layer of an electrically insulating material is interposed between the tape 1 and the strip 2, in order to electrically insulate the tape 1 from the strip 2.

In the left-hand side of the figure, a portion of the composite conductive element 100 is represented, after encapsulation of the tape 1 and the strip 2 in a sheath of polyimide such as Kapton™.

The construction of the composite conductive element also allows it to be modular and to adapt its configuration depending on the end application. For example, the conductive element may consist of a stack of one or more thermal and/or electrical conductors. According to one particular embodiment, the composite conductive element may comprise an electrically conductive high purity aluminium wire or tape thermalized by two strips of thermal conductor (pyrolytic graphite) placed on either side. In another particular embodiment, the composite conductive element may comprise two electrically conductive wires or tapes separated by a strip of thermal conductor in the centre.

Figure 6:
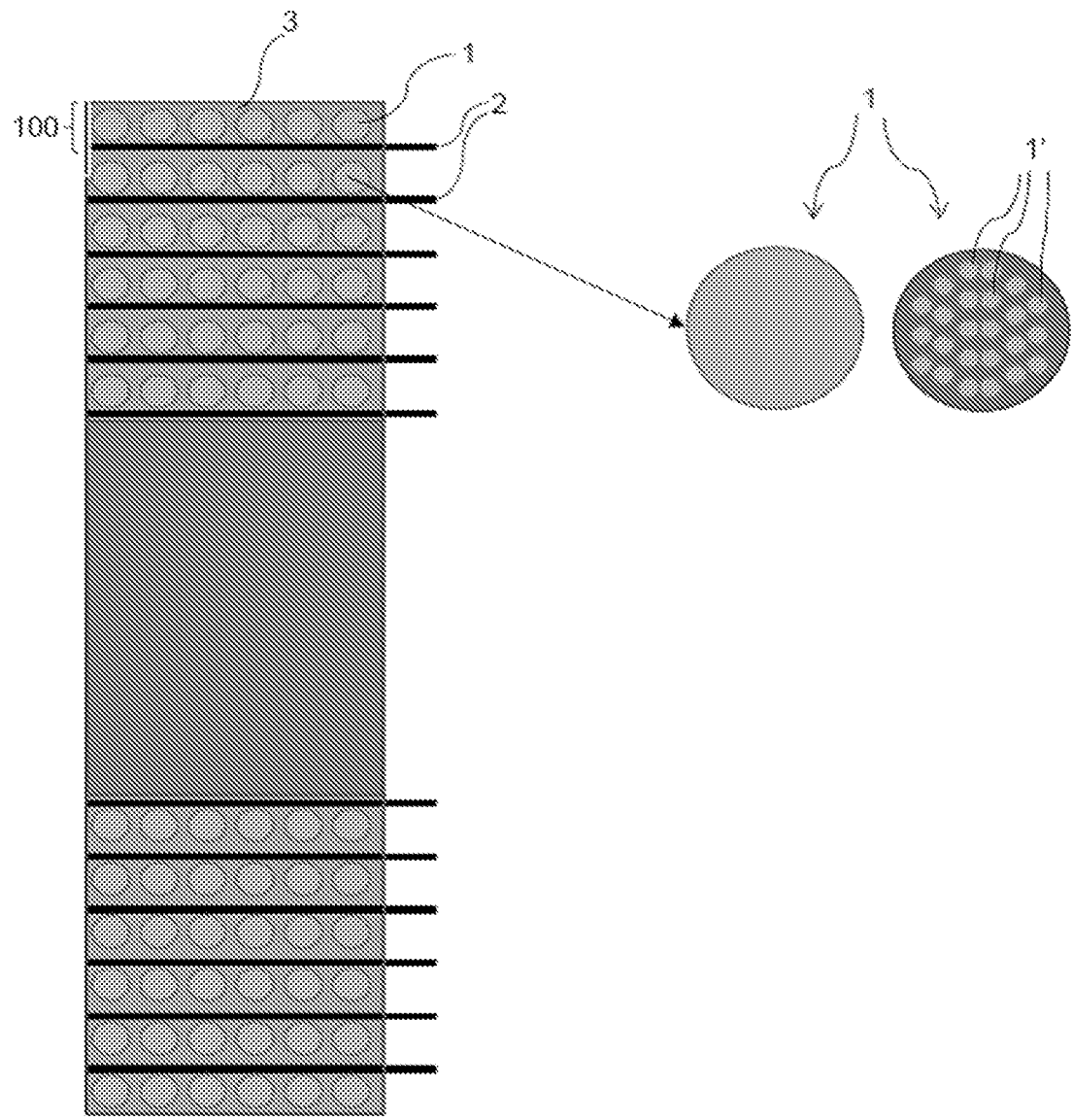
FIG. 6 is a schematic diagram of a coil including a conductive element according to the invention, combining a high purity aluminium wire and a pyrolytic graphite strip encapsulated in polyimide.

In the case where the electrically conductive element is a wire (single-strand, multi-strand or other such as Litz wires), several windings of said wire will advantageously be wound on the pyrolytic graphite strip to ensure good thermal dissipation of each of the wires. The whole set will be encapsulated with polyimide, particularly in the case where the wire is not electrically insulated. In the case of the use of an already electrically insulated wire, encapsulation with polyimide will not be necessary. The only function of encapsulation is then to ensure good thermal coupling between the thermal and electrical conductors and cohesion between the windings so that the coil retains its shape. In this case, the polyimide can be replaced by any other thermally conductive adhesive. An example of such a configuration is illustrated in FIG. 6, which will be described in detail below.

In the middle of FIG. 1, the portion of the composite conductive element 100 is represented in a partial cross-section view.

The manufacture of said composite conductive element may be carried out as follows.

A high purity aluminium wire or tape is provided.

A layer of polyimide in a liquid state is deposited onto said wire or tape, and then the pyrolytic graphite strip is applied to the polyimide layer, thereby providing electrical insulation between the aluminium wire or tape and the pyrolytic graphite strip.

The polyimide in a liquid state is then deposited again to form a sheath which completely encases the aluminium wire or tape 1 and the pyrolytic graphite strip.

This composite conductive element enables coils to be produced with high current density, low mass and with integrated cooling of the electrically conductive tape.

Figure 2:
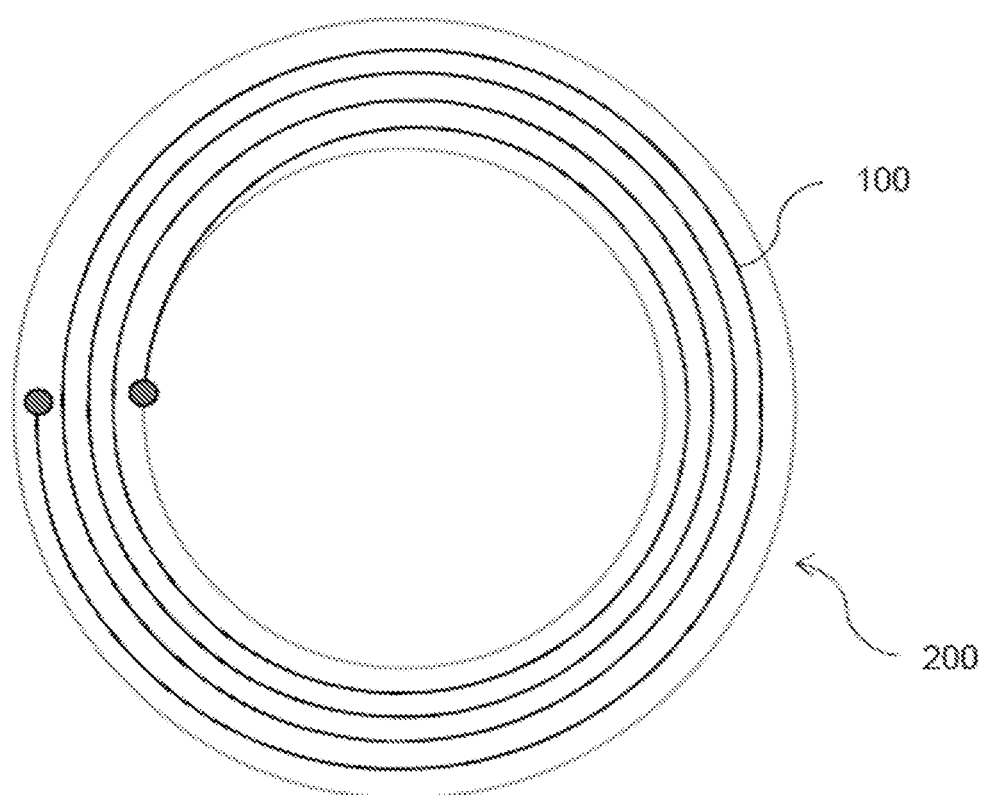
FIG. 2 is a schematic diagram of a coil including a conductive element according to the invention.
Figure 3:
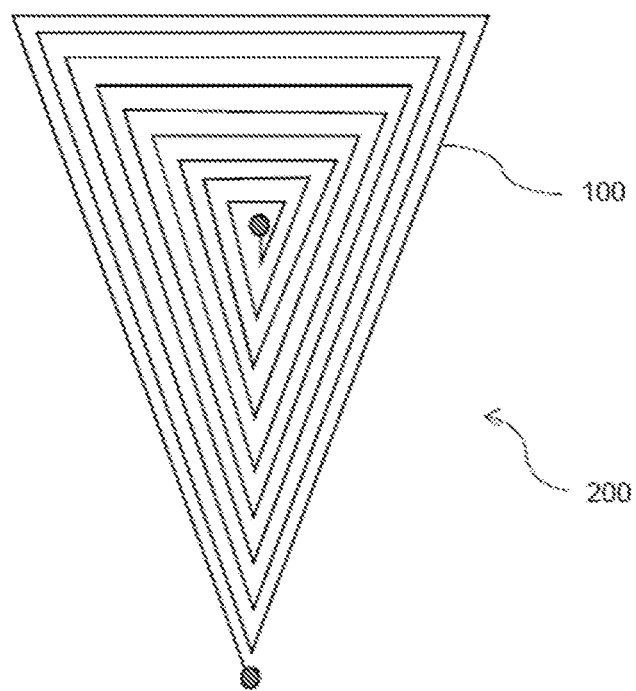
FIG. 3 is a schematic diagram of another coil including a conductive element according to the invention.

The coils made with this conductive element can be flat and spirally wound in a circular shape (see FIG. 2), triangular shape (see FIG. 3) or any other shape that ensures an optimum fill factor. The discs illustrated at each end of the composite conductive element 100 represent elements for connection to a power supply system and a heat removal system (not represented).

The composite conductive element can also be used to make cylindrical coils of more conventional shapes. In this case, the composite tape provides an optimal fill factor in comparison with conventional circular conductive elements. With the solution provided, the magnetic field density is then increased due to the higher number of turns, the mass is lowered with the use of the composite tape and the allowable power density is greatly increased with the use of graphite as a heat sink.

FIG. 4 illustrates one embodiment of a coil 200 comprising a winding of a plurality of turns of a composite conductive element 100. As is seen in the right-hand part, which shows an enlarged view of the part surrounded by the circle, the composite conductive element comprises a pyrolytic graphite strip 2 and a high purity aluminium tape 1 having a width less than that of the strip 2. The tape 1 and the part of the strip 2 facing the strip 1 are encapsulated in a polyimide sheath 3. The part of the pyrolytic graphite strip 2 that extends beyond the tape 1 is not encapsulated in the sheath 3. The coil 200 is associated with a heat removal system 400 adapted to circulate a cooling fluid 300 (water, oil, etc.) between an inlet and an outlet (schematically shown by the arrows). The part of the pyrolytic graphite strip 2 that extends beyond the tape 1 is immersed in the fluid 300, allowing direct cooling of the winding.

FIG. 5 illustrates one alternative to the embodiment shown in FIG. 4. The composite conductive one is similar to that of FIG. 4, but heat removal is achieved by a forced flow of a cooling fluid 300 (air, etc.) on the side of the part of the pyrolytic graphite strip 2 that extends beyond the high purity aluminium tape 1.

FIG. 6 illustrates one embodiment of a coil 200 comprising a winding of a plurality of turns of a composite conductive element 100. In this embodiment, the electrically conductive element is in the form of a wire. The right-hand part of the figure shows two embodiments of the wire 1, namely a single-strand high purity aluminium wire or a Litz wire comprising a plurality of high purity aluminium strands 1' encapsulated in an electrically insulating material. The thermally conductive element is a pyrolytic graphite strip 2. Each wire 1 is encapsulated with the strip 2 in a polyimide sheath 3. According to one embodiment, several wires 1 are arranged side by side across the width of the strip 2 and encapsulated together in the polyimide. Advantageously, a part of the pyrolytic graphite strip 2 extends beyond the set of wires 1 and the sheath 3, thereby exposing this part of the sheath to a cooling fluid, as discussed in connection with FIGS. 4 and 5.

Such coils can advantageously be used in rotating machines, motors or generators, in particular for use on-board airplanes or satellites.

These rotating machines can in particular be cryogenic machines. These cryogenic machines comprise a stator and a rotor rotatably movable relative to the stator. The rotor supports at least one superconductive element, for example a superconductive coil adapted to be electrically supplied by an AC voltage source or one or more magnetic inserts. Facing the superconductive element, the stator supports at least one coil including a conductive element according to the invention. Unlike the superconductive element of the rotor, the stator coil is operational at any temperature, including room temperature. The stator does not comprise any superconductive element.

The rotor is surrounded by a cryostat for maintaining the superconductive element at a cryogenic temperature, for example at a temperature between 20 and 80 K.

The rotor comprises an output shaft extending along the axis of rotation of the rotor. Said output shaft is adapted to be coupled to a shaft of a machine to be rotatably driven.

In a manner known per se, the rotor is rotatably driven by a magnetic field generated and controlled by both the stator and the rotor.

In some embodiments, the cryostat is fixed relative to the stator. In this case, the stator coil may be arranged against the outer surface of the cryostat or even inside the cryostat itself, thereby reducing distance between the superconductive element of the rotor and the stator coil. This reduced distance increases the magnetic field to which the stator coil is subjected.

The cryostat comprises a sealed enclosure inside which a vacuum can be pulled on. In this text, by "vacuum" it is meant a pressure less than or equal to 1 mbar (that is less than or equal to 100 Pa).

The rotor is freely rotatably mounted in the cryostat, by means of at least two bearings. Preferably, said bearings are arranged as far as possible from the superconductive element, so as not to be affected by the magnetic field it produces.

In addition, the output shaft is decoupled from the cryostat by a rotating seal which allows the shaft to rotate while ensuring that the cryostat is sealed.

In addition to the gain in distance between the superconductive element and the stator, the design of the rotating machine is simplified due to the immobility of the cryostat. The lifetime of the machine is thus extended. In particular, integration of a cryogenic cooler is facilitated in comparison with the case of a rotating cryostat.

Figure 7:
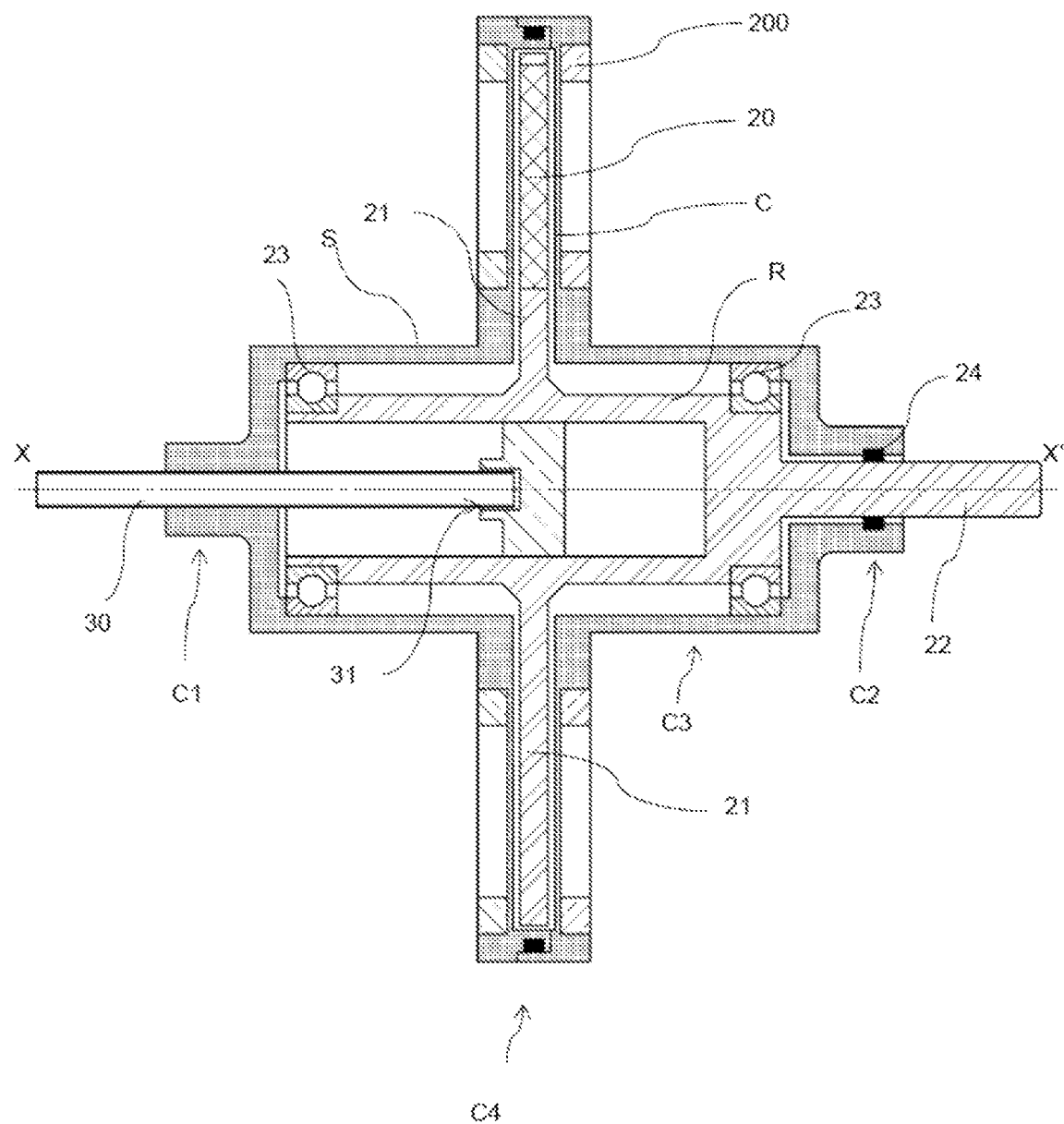
FIG. 7 is a cross-sectional view of a cryogenic rotating machine whose stator comprises a coil including a conductive element according to the invention.

FIG. 7 is a cross-sectional view of such a cryogenic machine.

The rotor is referred to as R. The rotor is rotatably movable about an axis XX' relative to the stator (not represented). The stator S comprises at least one coil 200 comprising a composite conductive element as described above.

The rotor has an axial portion which terminates in an output shaft 22. The rotor further comprises one or more wings 21 extending radially from an axial portion. At least one superconductive coil 20 is arranged on a respective wing. Alternatively (not represented), one or more superconductive magnetic inserts could be arranged on one or more wings of the rotor.

The superconductive coil 20 is arranged facing the stator coil 200.

The cryostat C surrounds the rotor R. The cryostat has an enclosure comprising, along the axis X-X', two end portions C1, C2 and a central portion C3 wider than the end portions.

A first end portion C1 comprises a passageway for a tube 30 allowing a heat transfer fluid to enter and exit the cryostat (the architecture of the heat transfer fluid circuit is not represented in detail). The tube 30 extends along the axis XX' and is in fluidic connection with a heat transfer fluid reservoir (not represented). The tube 30 is integral with the cryostat and sealingly assembled with the latter; it is decoupled from the rotor by a bearing (not represented) arranged at the interface 31 between the rotor and the tube 30. Alternatively, the tube 30 could be integral with the rotor; in this case, a rotating seal would be required at the interface between the end portion C1 of the cryostat and the tube 30.

A second end portion C2, opposite the first along axis XX', comprises a passageway for the output shaft 22 of the rotor. Sealing between the output shaft 22 and the portion C2 of the cryostat is ensured by a rotating seal 24.

The central portion C3 of the cryostat comprises a housing for the axial portion of the rotor, the rotor being freely rotatably mounted in the central portion C3 of the cryostat by two bearings 23. The bearings 23 are advantageously placed in the vicinity of the two ends of the central portion C3, on either side of the radial wings 21 of the rotor, to maximise the distance from the magnetic field generated by the superconductive coil. The cryostat comprises a radial extension C4 which extends from the central portion C3 (substantially in the middle of said central portion C3) surrounding the rotor wings 21. A small air gap is maintained between the inner surface of the radial extension of the cryostat and the outer surface of the rotor wings 21 to allow the passage of the heat transfer fluid in order to ensure efficient cooling of the superconductive coil. As a purely illustrative example, the width of said air gap may be in the order of 0.2 mm.

Furthermore, the cryostat may include a housing for the coil 200, whereby said coil may be in contact with the outer surface of the 3D radial extension of the cryostat, which is fixed.

The thickness of the cryostat in the radial extension C4 is relatively thinner than that of the rest of the cryostat, for example in the order of 1 mm.

Thus, the distance between the superconductive coil 20 and the coil 200 is equal to the sum of the air gap width and the cryostat thickness. This distance may be, for example, in the order of 1.2 mm. This represents a reduction in the order of 80% in comparison with a superconductive motor where the cryostat rotates with the rotor.

The invention claimed is:

1. An electrically and thermally conductive element comprising:
   a high purity aluminium wire or tape,
   a pyrolytic graphite or graphene strip extending along the aluminium tape,
   the wire or tape and the strip being encapsulated together in a sheath of an electrically insulating material.

2. The element of claim 1, wherein the electrically insulating material of the sheath is a polyimide, such as Kapton™.

3. The element according to claim 1, wherein the wire or tape is electrically insulated from the strip by a layer of said electrically insulating material.

4. The element according to claim 1, wherein the tape has a thickness between 10 and 200 µm.

5. The element according to claim 1, wherein the strip has a thickness of between 10 and 200 µm.

6. The element according to claim 1, wherein the pyrolytic graphite strip extends laterally outwardly of the tape.

7. A coil comprising at least one winding of an electrically and thermally conductive element comprising:
   a high purity aluminium wire or tape,
   a pyrolytic graphite or graphene strip extending along the aluminium tape,
   the wire or tape and the strip being encapsulated together in a sheath of an electrically insulating material.

8. A cryogenic rotating machine comprising at least one coil according to claim 7.

9. The cryogenic rotating machine according to claim 8, comprising:
   a stator comprising at least one coil according to claim 7,
   a rotor comprising at least one superconductive element, the rotor being rotatably movable relative to the stator, and
   a cryostat surrounding the rotor for maintaining the superconductive element at a cryogenic temperature, said cryostat being fixed relative to the stator.

* * * * *